Feb. 13, 1934.  J. F. BUHR  1,946,835
TABLE INDEX MECHANISM
Filed Nov. 14, 1929   2 Sheets-Sheet 1

INVENTOR.
JOSEPH F. BUHR
BY
ATTORNEY.

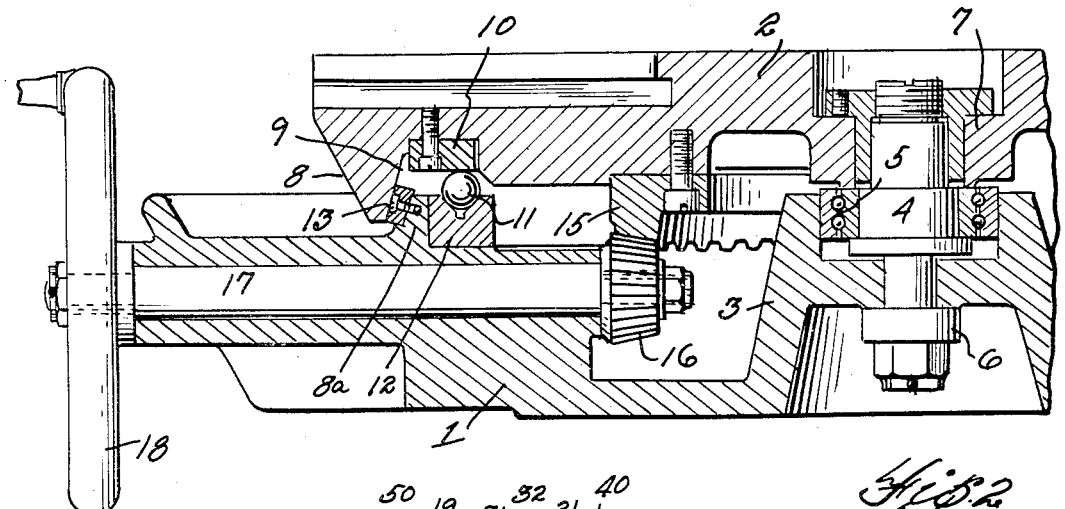
Fig. 2
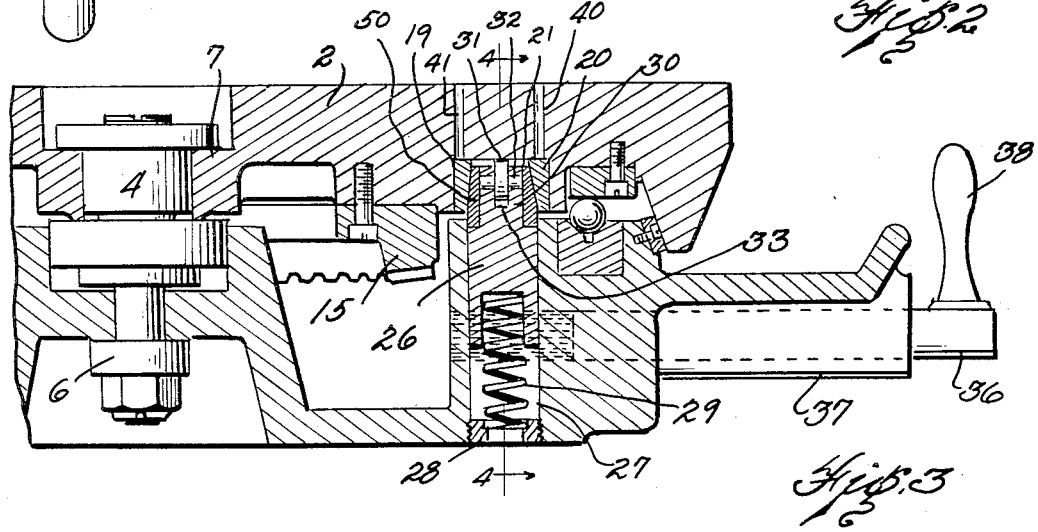
Fig. 3
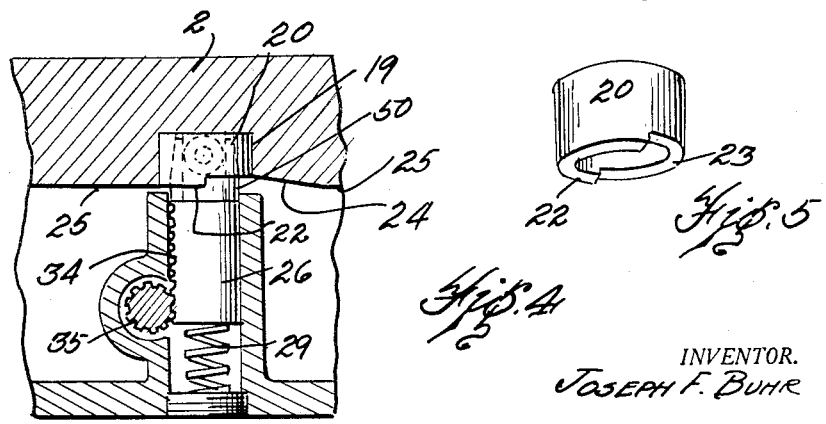
Fig. 4
Fig. 5
INVENTOR.
JOSEPH F. BUHR
BY
ATTORNEY.

Patented Feb. 13, 1934

1,946,835

UNITED STATES PATENT OFFICE 1,946,835

TABLE INDEX MECHANISM

Joseph F. Buhr, Ann Arbor, Mich., assignor to Buhr Machine Tool Co., Ann Arbor, Mich., a corporation of Michigan Application November 14, 1929
Serial No. 407,034

6 Claims. (Cl. 77—64)

This invention relates to index plates for machine tools, such for instance as multiple drills, in which there are several tools providing stations to which the work is to be moved in succession for the application of the respective tool thereto, and an object of the invention is to provide an index plate or table, on which a number of pieces of work may be mounted in the desired spaced relation, adapted to be turned to bring the pieces of work in succession to the tools at the given stations in combination with a manually operable means for turning the table and means adapted to automatically and positively lock the table to thereby position and hold the work at each station in succession.

Heretofore, with rotatable index tables it is more or less difficult to prevent the table from overrunning its necessary position and consequently, while gears have been used, the table must of necessity be turned slowly to reduce the momentum and liability of the table overrunning its successive positions. Thus, a feature of this invention is in providing gears of such ratio that the table may be quickly moved by a manual operation in conjunction with a lock structure that is certain in its operation to prevent the table from overrunning to position and that is accurate in the positioning of the table in its locked position.

It is further a feature of the invention to provide a lock structure that is acurate in the centering of the table at the locked points and that is of a character to compensate for wear.

These and other objects and the several features of the invention are hereinafter more fully described and claimed, and the preferred form of construction of an index table embodying my invention is shown in the accompanying drawings in which—

Fig. 2 is a section on an enlarged scale taken on line 2—2 of Fig. 1.

Fig. 3 is a section on an enlarged scale taken on line 3—3 of Fig. 1.

Fig. 4 is a vertical section through the locking device taken on line 4—4 of Fig. 1.

Fig. 5 is a detail in perspective of a portion of the lock device hereinafter termed the "strike" element.

Figure 1:
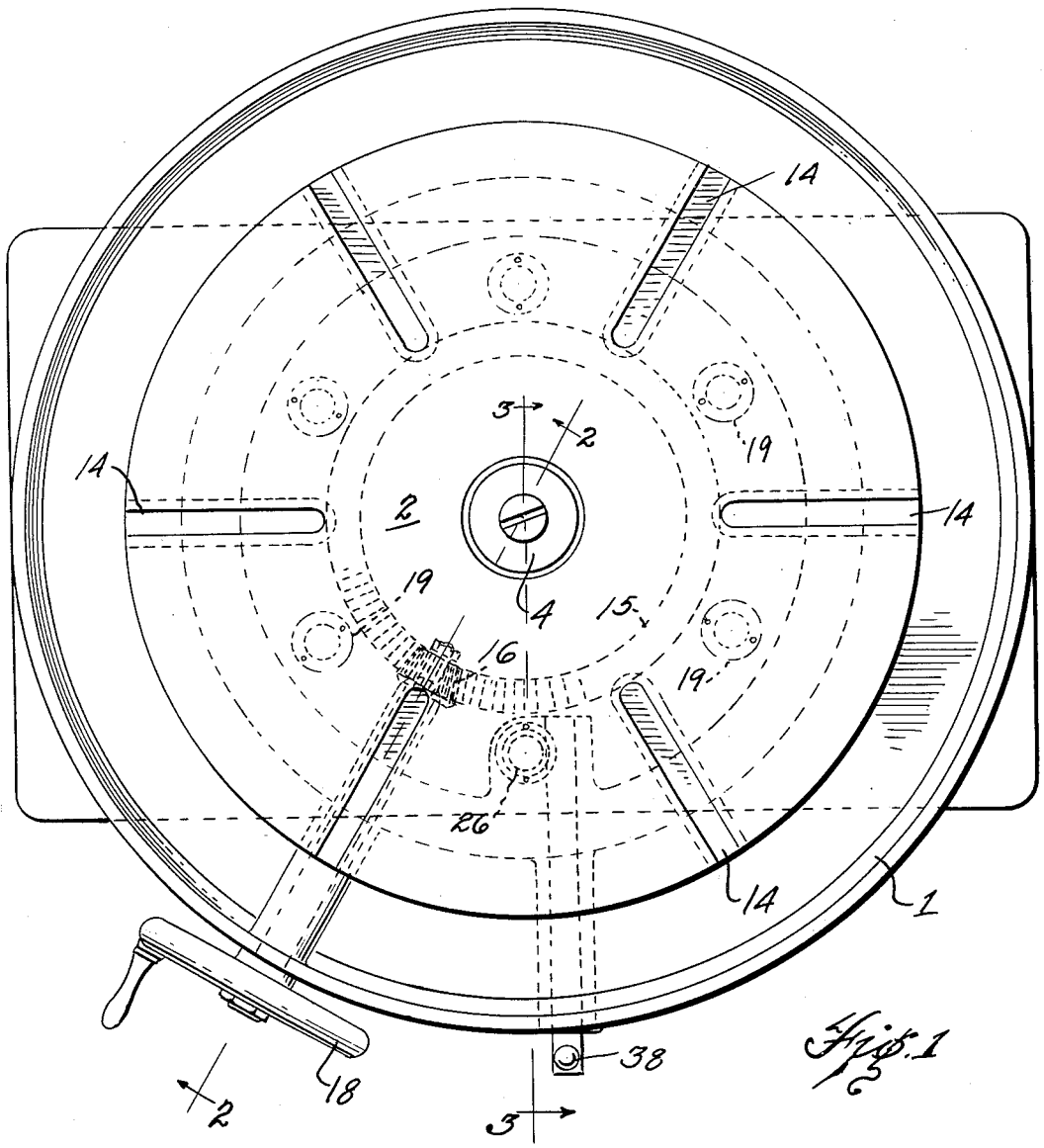
Fig. 1 is a plan view of my improved index table.

In its preferred form the structure consists of a base member 1 to be understood as being adapted to be supported in any necessary manner in the machine in which the index plate is to be used. The table or plate 2 is rotatably supported by the base. The base at its central portion is provided with an upwardly extending hub 3 supporting a central shaft 4 having the anti-friction bearings 5 and 6 and to which shaft the hub 7 of the plate is secured. The invention is not limited to the particular construciton of this central support as any convenient means for fixing the plate 2 to rotate freely about a central axis may be utilized.

The plate, near its periphery, has a depending edge or flange 8 and adjacent thereto on the under-surface of the plate is a groove 9 in which is secured a bearing ring 10 riding on a series of balls 11 which in turn ride in the ball groove in a ring 12 supported in the base. Thus, the plate 2 is supported centrally and peripherally by anti-friction bearings. To prevent dust and dirt entering the groove 9 and thus entering the bearings, a ring 13 of felt or other desirable material is secured on the outer face of a rib 8a on the base to engage the inner face of the flange 8 as shown more particularly in Fig. 2. The base 2 is provided with the radial undercut grooves 14, of which six are here shown, through and by means of which work may be supported at the spaced points about the table. On the under side of the table is also a ring gear 15 meshing with a spur gear 16 on a shaft 17 supported in the base. To the outer end of the shaft is attached an operating wheel 18 and by rotation of the wheel the table 2 with the work thereon may be turned.

It is to be understood that this device may be applied to any type of machine tool in which several pieces of work are mounted upon a table and brought in succession to position to be operated on by a tool of which there are a number above this table. Such machine tool structure, however, is not here shown as it is well known in the art and forms no part of this present invention.

In such machine tools, however, it is necessary that the separate pieces of work be brought accurately to position beneath the tools for operation thereon and the table locked in position during the operations of the tool and upon removal of the tool the plate is again turned to position the piece operated upon in position for operation by a second tool at a succeeding station. Thus, with a number of pieces of work on the table, the several tools may all operate at one time upon different pieces of work positioned on the table and thus in effect all of the possible operations to be performed by the tools of the machine are performed simultaneously and a finished piece of work may be taken from the table each time the plate is indexed.

Heretofore in such machines considerable trouble has arisen through the tendency of the index plate to overrun its station requiring time and care on the part of the operator to accurately position the table for the lock device. To overcome this difficulty I have provided an improved locking device that is certain and positive in its action thus practically eliminating the possibility of error in the positioning of the work relative to the tool and enabling the turning of the table to be made more quickly. Loss of time is therefor avoided through use of my improved structure including the lock device and greater accuracy secured in position and holding the table.

The locking device is shown more clearly in Figs. 3, 4 and 5. It is firstly to be understood that the table 2 at a number of points usually equal to the number of pieces of work that may be supported thereon is provided in its under face with a series of recesses 19 which, as shown in Fig. 2, extend circumferentially about the axis of the plate 2 in equi-distantly spaced relation to the slots 14 of the table. In each recess is inserted a sleeve 20 providing a strike element formed of a material to resist wear and provided with a cone shaped aperture 21. This element or sleeve 20 is shown in perspective in Fig. 5 and it will be noted at its lower end on one half its circumference at 22 is longer than the opposite side 23. It will also be noted that the lower face of the member 2 from a point forwardly of the recess is formed at an incline indicated at 24 in Fig. 4 extending upwardly from the lower face 25 of the plate and extending to the recess, and that the depth of the recess at this point is equal to the length of the member 20 from the point 23 to its upper end; further, that on the opposite side of the recess 19 the longer portion 22 of the member 20 is flush with the lower face 25 of the plate. The purpose of this construction is hereinafter explained.

The lock member consists of a spring projected plunger 26 riding in a vertical aperture 27 in a part 27a of the base extending to close association at its upper surface with the lower face of the plate. The aperture 27 is provided with a threaded nut 28 at its bottom end and a spring 29 is positioned therein to engage in a recess in the lower end of the plunger 26. The plunger at its upper end is provided with a cylindrical end portion or shoe 50 centrally apertured to fit over the reduced end portion 30 of the plunger. This shoe is of a wear resisting metal and is coned to fit the coned face of the aperture in the strike member 20. This reduced end portion 30 of the plunger is slotted at 33 to receive a roller 31 supported by a shaft 32 extending through apertures provided therefor in the portion 30. After this roller has been positioned in the slot and the shaft inserted the shoe 50 is then positioned thereon which holds the roller and shaft in place.

The plunger 26 is provided on one face with gear teeth 34 forming a rack to engage a rotatable gear 35 on the end of a shaft 36 which projects outwardly through bearings 37 on the base member. The outer projecting end of this shaft is provided with an operating handle 38 and by means of this handle the shaft may be turned to move the plunger downwardly in the recess 27 against the tension of the spring to disengage the shoe 50 from the strike member 20.

When so disengaged the wheel 18 may be turned to rotate the table 2 and thus the roller is brought to position to ride on the under face 25 of the table and will so ride until the next member 20 is brought to registration with the plunger whereupon the spring 29 will project the plunger and shoe 29 into the strike member. A particular feature of this lock construction is in the provision of the inclined face 24 on the forward side of the recess so that, as the table is turned, the roller 31 rides off from the face 25 onto the inclined portion 24 thereof. Thus, at the time the strike member 20 is brought to registration with the plunger, the plunger is already above the lower portion 22 of the member 20. Therefore before this member 20 reaches its station the shoe 50 is already above its inoperative or released position and therefore enters the member 20 with certainty and prevents an overrun of the table. The shoe 50 and the strike member 20, as previously stated, should be of a wear resistant metal, such for instance as a nickel steel alloy, that will not deform readily under the shock imposed thereon in operation and furthermore, the strike member 20 has the lip or depending portion 22 thereof supported by the metal of the table as will be understood from Fig. 4 and thus is sustained against shock preventing deformation of the parts.

By reason of the arrangement and construction of the several parts, I am enabled to provide an index table that is very freely movable and I may use a gear ratio as for instance approximately 6 to 1 permitting more than the usual sped of rotation in table of this character and yet with certainty stopping the table at the successive necessary points automatically.

The operation of the device is simple in the extreme it being only necessary to release the locking bolt 26 by depression of the handle 38 for an instant while the table is being started by rotation of the wheel 18. The member 38 may then almost instantly be released, the spring 27 maintaining the roller 31 in contact with the under face of the table in position to ride the incline 24 into the successive strike members 20 provided therein. Also, due to the coned aperture in the strike member and coned outer face of the shoe, these parts are adapted for long life as wear is gradually compensated for. If any wear takes place in these coned faces the shoe 50 merely enters the aperture of the member to a correspondingly greater extent. It is also continuously accurate even under wear between these surfaces in locating the table, as the axis of the strike member always coincides with the axis of the plunger.

Should the parts become worn to such extent that a tight fit between the shoe and the strike is not attained, the strike member may be removed by inserting pins through the apertures 40 and 41 in the table driving the strike member out of place and permitting insertion of a new one.

From the foregoing description it is believed evident that my improved index plate or table is of comparatively simple construction, is efficient in operation permitting rapid operation, positive and accurate in positioning the table at successive points, is of long life through housing the operating parts and bearings and use of wear resistant metal in the strike and plunger, and that the various objects of the invention are attained by the construction described.

Having thus fully described my invention, its utility and mode of operation, what I claim and desire to secure by Letters Patent of the United States is—

1. An index plate or table, comprising a base, a table rotatably supported thereby and adapted for the positioning of work thereon at several points about its periphery, means for turning the table comprising a rotatable gear mounted in the base, a companion gear connected with the table, manual means for rotating the first named gear and thereby turning the table, and means for stopping the table at successive points of its rotation determined by the positions occupied by the work comprising a series of equi-distantly positioned recesses corresponding in number to the number of stations occupied by the work, a spring-pressed plunger riding the under surface of the plate to engage in the successive recesses, the under surface of the plate being so constructed that, as a recess is brought toward the plunger, the end of the plunger arises above the surface traversed between the recesses before it enters the recess, the side of the recess opposite the side entered by the plunger providing a strike or stop for the plunger at the time the recess and plunger are in registration, the said recess having a coned aperture and the plunger having a coned end portion complemental thereto whereby engagement of the plunger in the recess accurately centers the same, and manual means for withdrawing the plunger to permit rotation of the table to bring successive recesses to be engaged by the plunger.

2. An index plate or table, comprising a base, a table rotatably supported thereon, anti-friction bearings between the table and the base, means comprising a driven gear and a driving gear therefor through rotation of which the table may be turned about its axis, means for locking the table successively at a number of points in its revolution comprising a series of recesses in the under surface of the table in the desired spaced relationship circumferentially about the axis thereof, a tubular metal insert providing a strike member in each of the recesses, the interior of the insert being cone-shaped in vertical section, a plunger with which the recesses and tubular portions therein are brought to registration successively, said plunger having a roller riding the under face of the table between the recesses and a coned shoe portion adapted to fit in the coned aperture of the strike member, said member being cut away at its lower end on the forward side, the opposite side of the lower end extending therebelow to practically flush relationship with the surface of the table traversed by the roller, the surface of the table on the forward side of the recess having an upwardly inclined portion leading from the surface normally traversed by the roller to approximately the lower end of the forward half part of the strike member, a spring normally tending to hold the roller in engagement with the table thereby causing the roller and end of the plunger to move upwardly from the surface traversed as it approaches registration with the aperture of the tubular member and thus positioning the end of the plunger above the lower rear portion of the tubular member to strike the same at the time the plunger axis is in vertical alignment with the axis of the tubular member.

3. In an index plate or table comprising a base, a table rotatably supported thereby, means for locking the table to the base, said means comprising a plunger reciprocatably supported in one of the members, a sleeve of wear resisting material secured at the end thereof having a coned outer face, a roller carried by the end of the plunger and riding the surface of the other of said members, and a spring tending to project the plunger, the other member provided with a coned recess complemental to the coned end of the plunger whereby engagement of the plunger in the recess accurately centers the same and compensates for wear between the coned end of the plunger and the recess.

4. In an index plate or table, a base, a table rotatably supported thereby, said table being adapted for the positioning of the work thereon at several equi-distantly spaced positions, means for turning the table, and means for stopping the table at successive points of its rotation determined by the positions occupied by the work comprising a series of equi-distantly positioned recesses circumferentially spaced to correspond to the stations occupied by the work, a tubular insert for each of said recesses formed of a wear resisting metal, a spring pressed plunger riding the under surface of the plate to successively engage in the tubular inserts, said plunger having a shoe at its end formed of a sleeve of a wear resisting metal fitted over the end of the plunger and being of a size to fit the tubular insert, the under surface of the plate having upwardly inclined portions forward of each recess and said tubular elements having the forward edge cut out to permit the plunger to ride up the inclined surface and to a point above the rear edge of the insert whereby as the recess and insert are brought to registration the upper end of the plunger is above the rear wall of the insert thereby providing a strike for the plunger and preventing the table from overrunning its successive predetermined position, and a manual means for withdrawing the plunger from a recess against the tension of the spring.

5. An index plate or table, comprising a base, a table positioned centrally thereof and revolvable thereon, anti-friction bearings between the table and the base, a ring gear on the under face of the table, a driving gear therefor rotatably supported by the base, manual means for rotating the driving gear, a lock arrangement by means of which the table is automatically stopped at successive predetermined points of its revolution, comprising a plunger, the base having an aperture in which the plunger is longitudinally reciprocatable, a spring supported in the aperture tending to hold the end of the plunger in engagement with the under face of the table, an anti-friction member carried at the end of the plunger, a tubular member of wear resisting material fitting the end of the plunger, the face of the table having a series of recesses therein circularly arranged, a tubular element of wear resisting material fitting in each recess, the said tubular members of the plunger and of the recess being complementally formed and the face of the table at the forward side of each of the recesses first approaching the plunger being inclined upwardly thereby providing a means permitting the plunger to rise through action of its spring to a point above the bottom face of the table and thus strike the rear face of the recess therein at the time the recess and plunger come to registration, and manual means for withdrawing the plunger against the tension of the spring from engagement with a recess in the table.

6. An index plate or table comprising a base, a table rotatably supported thereby, and means for locking the table to the base, comprising a plunger reciprocatably mounted in one of said members, a roller supported in the end thereof and a shaft therefor extending through apertures provided in the end thereof, the plunger being slotted to receive the roller, a sleeve fitting over the end of the plunger and enclosing the shaft, a spring tending to project the plunger, the other of said members having a series of coned recesses in its face in which the plunger end may fit, said roller riding the recessed face and each of the said recesses being of such depth that the coned face of the plunger is seated therein prior to the roller element contacting the bottom of the recess, the face of the recessed member at the forward side of each of the recesses first approaching the plunger being cut on an incline to below the surface providing a means permitting the plunger to move through the action of its spring to a point beyond the face of the table and thus strike the rear face of the recess therein as the recess and plunger come to registration, and means for withdrawing the plunger from the recess against the tension of its spring.

JOSEPH F. BUHR.